United States Patent [19]

Arechaga

[11] Patent Number: 4,635,755

[45] Date of Patent: Jan. 13, 1987

[54] BACKWOUND PRE-STRESSED SPRING MOTOR AND METHOD

[75] Inventor: John C. Arechaga, Lansdale, Pa.

[73] Assignee: Ametek, Inc., New York, N.Y.

[21] Appl. No.: 691,899

[22] Filed: Jan. 16, 1985

[51] Int. Cl.[4] .............................................. F03G 1/00
[52] U.S. Cl. ................................... 185/45; 242/78.3; 267/59; 267/156
[58] Field of Search ................... 185/9, 37, 39, 45; 267/59, 156; 242/101.1, 107.1, 78.3

[56] References Cited

U.S. PATENT DOCUMENTS

| | | | |
|---|---|---|---|
| 1,057,543 | 4/1913 | Green | 185/45 |
| 2,372,932 | 4/1945 | Brockman | 185/39 |
| 2,548,735 | 4/1951 | Meletti et al. | 219/3 |
| 2,833,027 | 5/1958 | Foster | 29/173 |
| 2,833,534 | 5/1958 | Foster | 267/1 |
| 2,899,193 | 8/1959 | Foster | 267/1 |
| 3,003,316 | 5/1962 | Foster | 185/37 |
| 3,047,280 | 7/1962 | Pernetta | 261/1 |
| 3,346,938 | 10/1967 | Becker | 29/173 |
| 3,363,891 | 1/1968 | Foster | 267/1 |
| 3,788,631 | 1/1974 | Aldous | 267/156 |
| 4,061,291 | 12/1977 | Cunningham | 242/107 |
| 4,084,764 | 4/1978 | Mogerlein et al. | 242/107 |
| 4,088,280 | 5/1978 | Arlauskas et al. | 242/107 |
| 4,171,109 | 10/1979 | Roe | 242/107 |
| 4,253,620 | 3/1981 | Takei et al. | 242/107 |
| 4,429,840 | 2/1984 | Chawla | 242/107 |

FOREIGN PATENT DOCUMENTS

| | | | |
|---|---|---|---|
| 2737272 | 3/1979 | Fed. Rep. of Germany | 185/45 |
| 1280697 | 11/1961 | France | 267/156 |

Primary Examiner—Lawrence J. Staab
Assistant Examiner—Martin G. Belisario
Attorney, Agent, or Firm—Amster, Rothstein & Ebenstein

[57] ABSTRACT

A backwound pre-stressed flat spring motor and method of making the same having a pre-stressed spring element backwound on a central arbor within a cup wherein a portion of the spring element extends beyond the arbor wherein the initial turns of spring element backwound on the central arbor comprise alternating layers of the extended portion of the spring and the spring element resulting in increased initial torque when compared to a conventional backwound pre-stressed spring motor having the same construction otherwise.

18 Claims, 9 Drawing Figures

BACKWOUND PRE-STRESSED SPRING MOTOR AND METHOD

The present invention relates generally to backwound pre-stressed flat springs and spring motors having pre-stressed spring elements which are backwound around a central arbor within a coaxial keeper or cup; and, in particular, to an improvement in the construction of the spring element of such spring motors and a method of making the same which results in a spring motor capable of exerting a useful force after a smaller number of initial turns or "prewinds" than a conventional backwound pre-stressed flat spring motor made in accordance with conventional construction techniques out of the same material. Alternatively, the improved spring of the present invention can be made of thinner, shorter or narrower material than a conventional pre-stressed spring while exhibiting substantially the same performance.

In the improved spring of the present invention, the inner end of the spring element includes an extended eye portion which is fastened to the arbor. When the spring element is backwound around the arbor, the initial turns of material comprise alternating layers of the extended eye portion and the spring element.

Conventional backwound pre-stressed flat spring motors and a method of making the same are disclosed in U.S. Pat. Nos. 2,833,534 and 2,833,027, respectively. Such springs and spring motors are sold by the Hunter Spring Division of Ametek, Inc. under the registered trademark SPIR'ATOR. As taught by U.S. Pat. No. 2,833,027, a SPIR'ATOR spring can be produced by starting with a pre-stressed flat coil spring which, in its relaxed position, assumes a tightly wound coil. The pre-stressed tightly wound flat spring is sold by the Hunter Spring Division of Ametek, Inc. under the registered trademark NEG'ATOR. Such spring is next backwound around an arbor. Alternatively, as taught by the '027 Patent, it is possible to pre-stress and backwind a flat spring around an arbor forming a conventional backwound pre-stressed flat spring in a single operation.

One end of the spring element is fastened to a central arbor and the remainder of the spring is backwound around the arbor. That is, the pre-stressed flat coil spring is caused to wind around the arbor in a direction opposite to the direction of curvature it assumed in its relaxed, tightly wound condition. The outer end of the backwound spring element is fastened to a keeper or cup.

In operation, the arbor rotates relative to the keeper. When the spring motor is wound, the arbor is rotated so the spring element becomes tightly backwound about the arbor with each coil adjacent the next coil. When the arbor is released, the spring element exerts a force causing the arbor to rotate from the condition where the spring element is tightly backwound around the arbor to a condition where the spring element is backwound within the keeper. During operation, and as long as it is maintained within the keeper, the spring element is always retained in a condition where it is wound in a direction of curvature opposite to the direction of curvature to which it was initially preset.

A backwound pre-stressed flat spring motor is used in a great many devices. For instance, the spring is particularly applicable for use as motors for cameras, clocks, toys, measuring tape reels, various winding and reeling devices and, in particular, has become widely used as a means of retracting automotive seat belts. The backwound pre-stressed spring motor is particularly useful in this latter application since such spring motor exhibits a more substantially constant force or torque throughout the entire working length of the coiled spring than a comparable power spring.

When used in a seat belt retraction unit either the central arbor is attached to a spool around which the seatbelt is wound and the keeper is fixed or the keeper is fastened to the seat belt winding means and the arbor is fixed. In either case, as the seat belt is withdrawn the spring element becomes tightly wound around the arbor. When the seat belt is released the force necessary to retract the seat belt is exerted by the spring element unwinding from the arbor to a "relaxed" condition where the spring element is backwound adjacent the keeper.

It is desirable for the force exerted by the spring to remain substantially constant as a seat belt is withdrawn to a length sufficient to wrap around a user's waist. Otherwise, if the force exerted by the spring as the belt is substantially withdrawn is much greater than the initial force exerted by the spring when the seat belt is first withdrawn, the seat belt will be uncomfortable to wear. However, since a backwound pre-stressed spring motor does exhibit some gradient or increase in torque as the seat belt is fully withdrawn the force exerted at the substantially withdrawn condition is the limiting factor. Thus, the spring element must be designed to exert a maximum retraction force which is still comfortable. Necessarily, when the seat belt is released and the spring called upon to fully withdraw the seat belt into the seat belt retracting means, the force exerted by the spring during its last few turns may not be sufficient to fully withdraw the seat belt. If the force is not sufficient, the buckle portion may become damaged by engagement with the car door or the spring may not be sufficiently retracted to release the seat belt locking means thereby preventing the seat belt from being withdrawn the next time it is used.

One means of overcoming this inherent shortcoming is to use a thicker or wider spring which exerts a greater force over its entire working length. However, such solution to the problem may result in a spring which exerts too high a force over the remainder of its working length and, in particular, in the area of its operation where the seat belt is extended around the body of a driver or passenger a sufficient distance to be fastened. Consequently, the retraction force in such range may be uncomfortable for the seat belt wearer. Further, shortcomings from the use of thicker or wider spring material is a corresponding increase in the cost of the spring element and a decreased fatigue life of the spring element.

Alternatively, prior art seat belt retractor means use more initial turns, and in some cases four or as many as ten initial turns in order to assure that the torque exerted by the spring during the first few inches of travel (or last few inches of retraction) are sufficient to fully retract the seat belt. Such solution, again, requires substantially longer springs with a corresponding increase in material costs.

Since this problem has been recognized, various means have been devised for increasing the torque output of the backwound pre-stressed spring motor during its first few turns. For example, U.S. Pat. No. 4,061,291 utilizes a variable torque drive between a standard power spring and the seat belt retractor reel. The drive varies the torque output on the seat belt over its range of travel and provides a high retractive force or torque for the last few inches of withdrawal without having high torque over the entire range. However, such device is complex and correspondingly expensive.

Likewise, U.S. Pat. No. 3,788,631 attempts to overcome the problem by only pre-stressing the beginning and end of the spring and leaving the center portion of the spring substantially unstressed. Thus, the device is, in effect, a composite of the inner portion and outer portion having characteristics of a backwound prestressed flat spring while the center portion has the characteristics of a simple power spring. The spring exerts high force at the beginning and end of travel and lower force in the center of its useful range of travel. Such solution is not equally comfortable for large and small users and it is more expensive to fabricate the composite spring element.

U.S. Pat. No. 4,084,764 incorporates a brake device which counteracts the retractive force of the spring when the seat belt is in the extended range. Thus, a higher spring force can be used over the entire range to assure that sufficient retractive force will be available at the beginning of useful range. Again, such device is inherently complex and, corresponding, expensive.

Consequently, it is an overall object of the present invention to provide an improved spring and method of making the same which overcomes these and other shortcomings of the prior art. Specifically, it is an object of the present invention to provide a spring having an extended eye portion which produces a higher initial torque without a corresponding, yet undesirable, increase in torque over the entire working range of the spring.

It is further object of the present invention to provide a spring which exhibits a higher initial torque without requiring, wider, thicker or longer spring material.

It is a still further object of the present invention to provide a spring motor which exhibits a higher initial torque without sacrificing fatigue life.

It is a still further object of the present invention, alternatively, to use thinner, narrower or shorter lengths of spring material to produce performance comparable to conventional backwound pre-stressed springs.

It is a still further object of the present invention to provide a method of making a backwound pre-stressed flat spring for use in the spring motor which exhibits the improved performance of the present invention and overcomes the shortcomings of the prior art discussed above.

In accordance with these and other objects of the present invention there is provided, an improved backwound pre-stressed flat spring motor which includes an arbor, a spring retaining means or cup or keeper substantially concentric to the arbor and the arbor being rotatable relative to the spring retaining means. A prestressed flat spring element having a natural direction of curvature and a first end including an eye portion extending from the first end and a second end is located in the spring retaining means. The first end of the spring element is fastened to the arbor with the extending eye portion extending past the arbor and the spring element is backwound around the arbor in a direction opposite the natural direction of curvature of the spring element and the second end of the spring element is fastened to the retaining means whereby the extended eye portion and the first end of the spring element are backwound around the arbor in alternating layers.

The present invention also provides a method of making an improved backwound pre-stressed flat spring motor having a cup or keeper, a central arbor in the cup which is substantially coaxial or concentric to the cup and rotatable relative to the cup and a pre-stressed flat spring element backwound about the arbor and retained in the cup and fastened to the arbor and the cup comprising the steps of initially forming the pre-stressed spring into a tightly wound coil having a normal direction of curvature a first end and a second end. The first end of the coil is fastened to the arbor with a portion of the first end of the coil extending beyond the arbor. The arbor is wound in the direction opposite to the normal direction of curvature and the second end of the coil is fastened to the cup. The portion of the first end of the coil may be curved in the direction of the coil or may be substantially straight extending from the coil and when the arbor is first backwound alternating layers of the portion of the first end of the coil extending beyond the arbor and the rest of the first end of the spring element are initially wound around the arbor.

The above brief description as well as further objects and features of the present invention will be more fully understood by reference to the following detailed description of the presently preferred, albeit illustrative, embodiment of the present invention when taken in conjunction with the accompanying drawings wherein.

Figure 1:
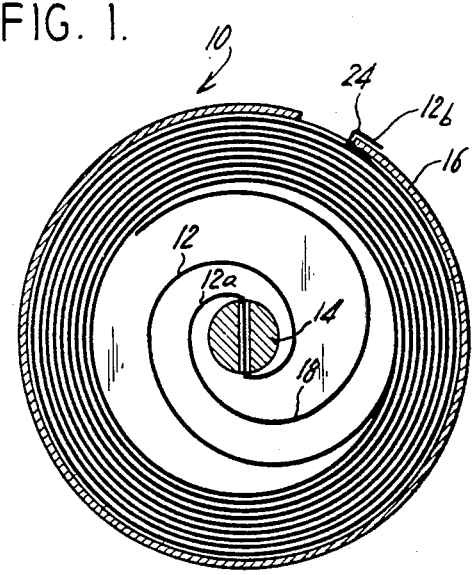
FIG. 1 is a side elevational view of the improved backwound spring of the present invention in its unwound condition.

Referring to the drawings and, in particular to FIG. 1., there is provided a spring motor generally designated by the reference numeral 10. Spring motor 10 includes a pre-stressed spring element 12 with an inner end 12a which is wrapped around a split arbor 14 and an outer end 12b which is formed in a hook shape 24 and fastened to a keeper or cup 16. The spring element 12 of the present invention has an extended eye portion 18 which, as best shown in FIG. 3, extends beyond the split arbor 14.

In operation, the split arbor 14 and keeper 16 rotate relative to each other during winding and unwinding of the spring motor 10. The outer end 12b of the spring element 12 can be shaped as best shown in FIG. 2 to frictionally engage the cup 16 or can be fastened to cup 16 by a rivet or other mechanical means.

Figure 2:
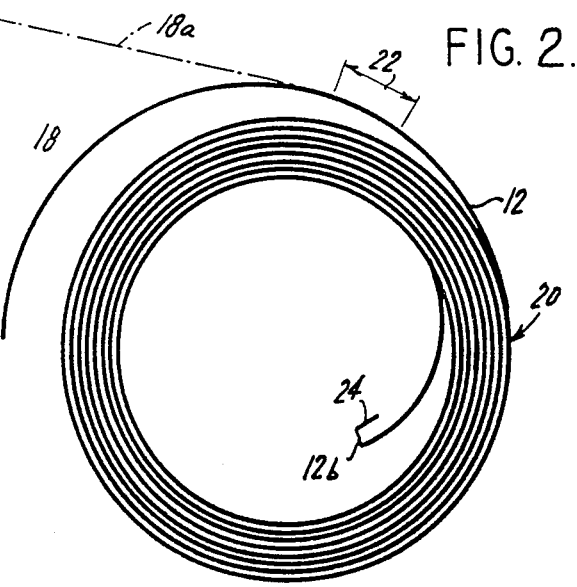
FIG. 2 is a side elevational view of a tightly coiled, pre-stressed coil spring before it is backwound.

The spring motor 10 is formed from a pre-stressed, tightly wound spring which is initially oriented as shown in FIG. 2. Before backwinding, the outer end 12b of the spring element 12 is inside the tightly wound pre-stressed coil generally designated by the reference numeral 20. The extended eye 18 can be pre-stressed with substantially the same initial curvature as the tight coil 20 or can be straight as shown by the extended eye 18a in broken lines in FIG. 2.

Figure 3:
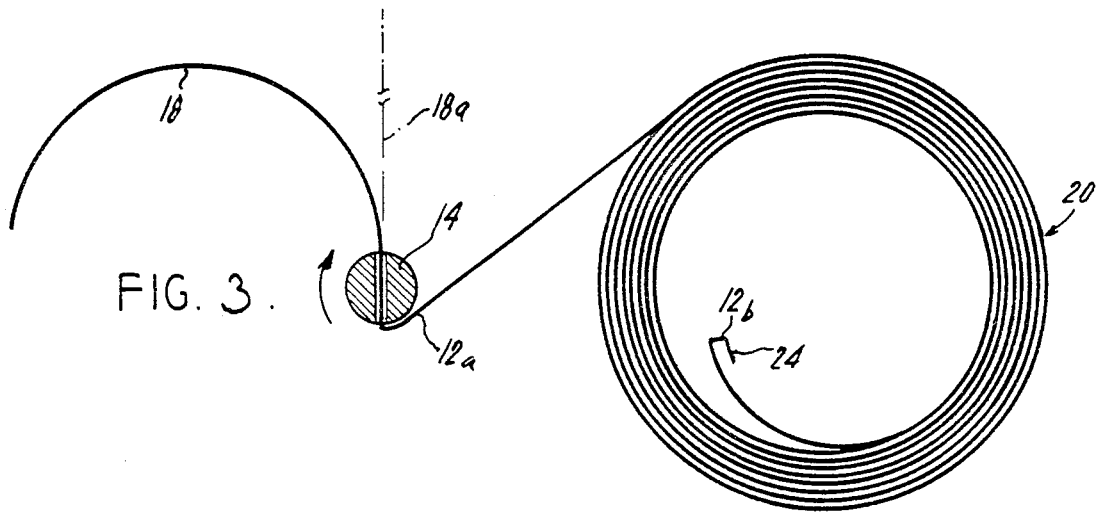
FIG. 3 is a side elevational view showing the spring of FIG. 2 engaged in an arbor at the commencement of the backwinding operation.

Approximately 3 or 4 inches of the spring element 12 extends beyond the split arbor 14 forming the extended eye 18, 18a, as shown in FIG. 3. The arbor is then rotated in the clockwise direction shown by the arrow in FIGS. 3 and 4. An arbor 14 continues to rotate, the inner end 12a of the spring element 12 is wound about the arbor 14 in a direction opposite the direction of initial curvature of the pre-stressed spring forming the tightly wound coil 20.

Figure 5:
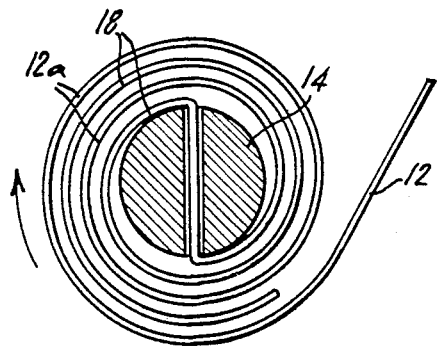
FIG. 5 is a detailed, side elevational view, in an enlarged scale, showing further backwinding of the spring of FIG. 4.

As best shown in FIG. 5 as arbor 14 continues to rotate in the direction shown by the arrow alternate layers of the inner end 12a of spring element 12 and the extended eye, 18, 18a are backwound about the arbor 14. In actuality, during backwinding, the alternating layers of inner end 12a of the spring element 12 and the extended eye 18 are closely backwound; however, the spring shown in FIG. 5 shows separated layers for the sake of clarity.

Figure 6:
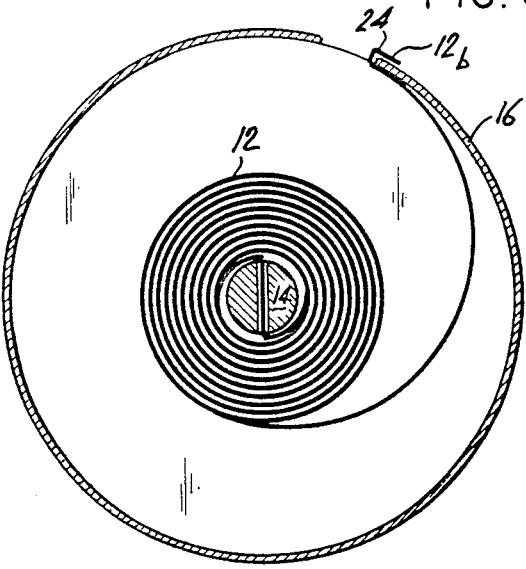
FIG. 6 is a side elevational view of the improved spring of the present invention in the fully wound condition.

When the spring of the present invention is fully wound, it assumes the orientation shown in FIG. 6 with substantially the entire spring element 12 tightly backwound about the split arbor 14. The outer end 12b of the spring element 12 is clipped to the cup 16.

When the spring motor 10 made in accordance with the present invention is used in a seat belt retractor means either the arbor 14 or the keeper 16 is fastened to the seat belt spool (not shown) in a conventional manner and the other component is fastened to the retractor assembly. When the seat belt is withdrawn the arbor 14 rotates relative to the keeper 16. When the seat belt is withdrawn to the full extent of its travel, the spring motor 10 assumes substantially the orientation shown in FIG. 6. As the seat belt is fully retracted, arbor 14 is driven in a counterclockwise direction by the spring element 12 and, if allowed to assume its relaxed position, will unwind until it assumes the orientation shown in FIG. 1. Typically, when properly designed, the spring motor 10 will operate in a range whereby the spring element 12 unwinds to an orientation with a few more turns than that shown in FIG. 1 to an orientation with a few less turns than that shown in FIG. 6.

As is known to those with ordinary skill in the art, a backwound pre-stressed spring exerts a more substantially constant spring force during its working range than a comparable power spring because, after several initial turns, substantially the entire spring element 12 becomes active filling the area between the arbor 14 and the keeper 16 with spaced windings of spring material.

Figure 7:
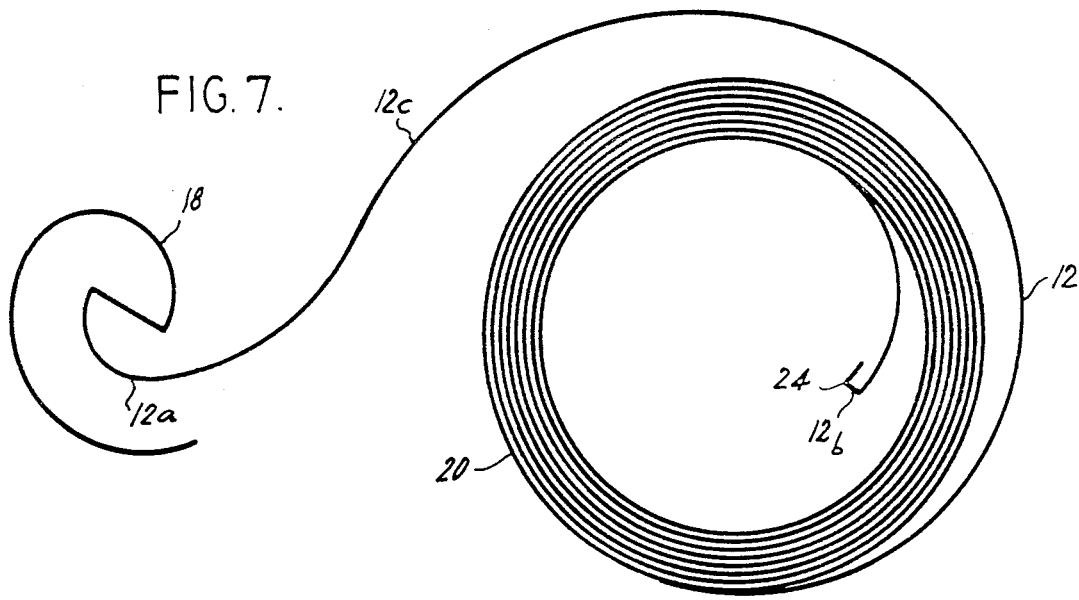
FIG. 7 is a side elevational view of the improved spring of the present invention in its unrestrained condition after backwinding.

After the spring element 12 of the present invention has been backwound about the split arbor 14 at least once and is then removed from the keeper or cup 16, it assumes an unrestrained configuration substantially similar to that shown in FIG. 7. Depending upon the relationship between the arbor diameter and the yield stress of the material comprising the spring element 12, more or less material will be overstressed during backwinding resulting in a corresponding length of the inner end 12a of the spring element 12 assuming a curvature in the direction of backwinding. Typically, as the arbor diameter decreases, the amount of material which is over stressed increases. Likewise, as the yield stress of the material decreases the length of overstressed material with a reverse curvature increases correspondingly. The material in the extended eye portion 18, if initially stressed, will assume substantially the orientation shown in FIG. 7 and if straight, as shown in the extended portion 18a in FIG. 2, may be substantially straight (not shown) or would assume the curvature shown in FIG. 7, depending upon the arbor diameter and the yield stress of the material comprising the spring element 12. Further, the straight portion 12c of the spring element 12 may be longer and the overall diameter of the material comprising the type coil 20 may increase. Still further, those with ordinary skill in the art understand that a relationship between the arbor diameter, the width and thickness of the material comprising the spring element 12, the physical characteristics of the material comprising spring element 12 and the inside diameter of the keeper or cup all affect the unrestrained condition of the spring element 12.

Figure 8:
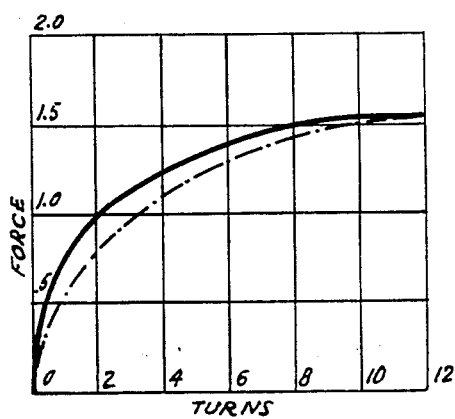
FIG. 8 is a plot showing the force verus deflection for a prior art spring and the improved spring of the present invention having a particular extended eye construction.

To illustrate the improved performance of the spring motor 10 made in accordance with the present invention, FIG. 8 shows force versus deflection curves for two substantially identical springs made in the conventional construction (broken line) and the improved construction of the present invention (solid line). Specifically, the conventional backwound, prestressed spring motor was constructed with a spring element 12 of 301 high yield stainless steel 0.009 inches thick and 0.375 inches wide. The spring element was wound around a 0.375 inch diameter arbor and placed inside a cup having an inside diameter of 1.475 inches. The spring was 80 inches long and the inner most 2 inches of length were annealed to engage the arbor. The improved spring whose torque versus deflection is depicted in FIG. 8 is identical to the conventional spring except none of the length was annealed and instead the spring was only 78 inches long and had a 3 inch, pre-stressed extended eye portion.

As shown by the comparative torque versus deflection curves, the improved spring made in accordance with the present invention had a substantially higher initial torque. Specifically, the improved spring (solid line) exerted a torque of one inch-pound after just two turns rather than 3 turns as in the conventional spring. Likewise, if the particular specification called for a minimum torque of 1.15 inch-pounds, such level of torque is reached by the improved spring after just 3 turns while an otherwise conventional spring required four turns. Thus, as a result of the increased initial torque output resulting from an extended eye construction, a spring designer has the choice of either using a shorter spring element, a narrower spring, thinner spring or a combination of the above yet still obtain performance equal to that of a conventional backwound pre-stressed spring. Alternatively, the spring design can stay the same with the exception of the extended eye and enhanced initial performance will be obtained thereby assuring that, when used in a seat belt retractor assembly, for example, the seat belt will be fully retracted.

Figure 9:
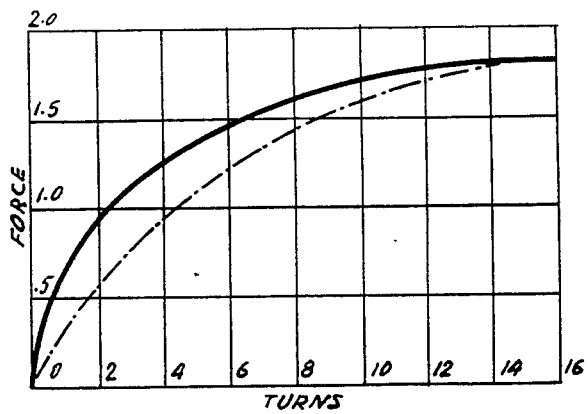
FIG. 9 is a force-deflection curve for a prior art backwound spring and the improved spring of the present invention having a different extended eye construction.

The comparative force-deflection curves shown in FIG. 9 demonstrates that a straight, rather than a curved, pre-stressed extended eye portion may result in an even greater improvement over the performance of a conventional spring element. The spring element of both springs whose performance is depicted in FIG. 9 were made from 301 high yield stainless steel 0.008 inches thick and 0.562 inches wide. Both springs were backwound around a 0.300 inch diameter arbor within a 1.625 inch inside diameter cup. The conventional spring was 107 inches long with the inner most 2 inches being annealed while the improved spring was 105 inches long and had a straight extended eye, 4 in. long. As shown by the comparative curves of FIG. 9, the performance of the improved spring shown by the solid line in FIG. 9 exhibited 50% more torque after just 2 turns and 25% more torque after 4 turns than the conventional backwound pre-stressed spring (broken line). Thus, the width of the spring element of the spring made in accordance with the present invention could be reduced to ⅔ of its original width without sacrificing performance. Alternatively, and most advantageously, the improved spring could be made of thinner material, e.g. 0.007 inches instead of 0.008 inches. The advantage of using thinner material is two-fold. First, the fatigue life of thinner material is substantially increased. Second, since the material is thinner, as the material builds up around the arbor each layer of thinner material would increase the effective diameter of the arbor a smaller amount. Consequently, more turns would be available from any given length of material thereby allowing a shorter length of material to be used.

In accordance with the method of the present invention, the improved spring is constructed by engaging the arbor in a manner that allows an extended eye of 3 to 4 inches to be formed. Typically, the extended eye portion should be at least three times the circumference of the arbor to assume that at least approximately the first three turns of spring material backwound around the arbor includes alternating layers of extended eye and inner spring element material. Although the drawings herein show the use of a split arbor and the engagement of the spring material within the split in the arbor itself, other conventional means of attaching the spring element 12 to the arbor 14 can be used.

Figure 4:
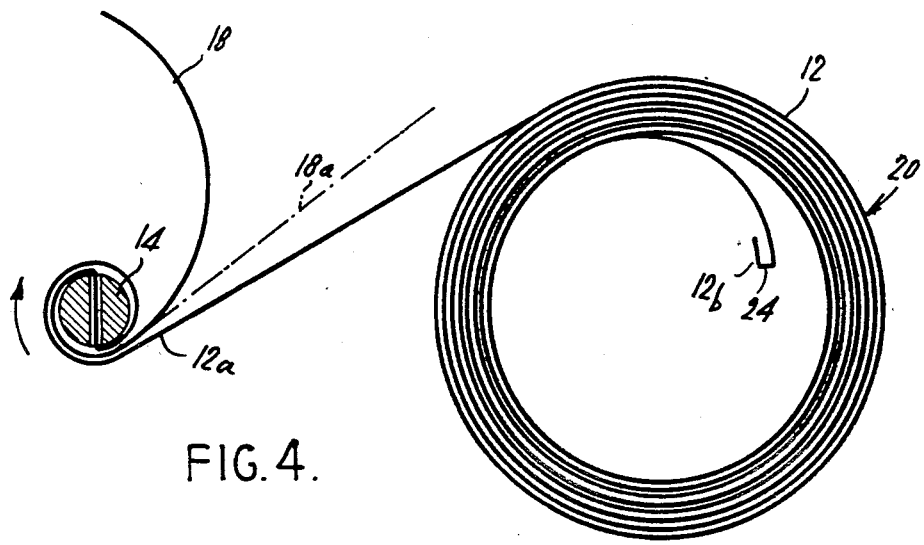
FIG. 4 is a side elevational view of the spring of FIG. 3 as the backwinding operation continues.

In the method of the present invention, the outer portion of a pre-stressed, tightly coiled flat spring 20 (FIG. 2) is engaged about a relatively rotatable arbor 14. A short length of the outer portion of the pre-stressed spring extends beyond the arbor 14 as shown in FIG. 3. The arbor is then rotated in a direction opposite the natural radius of curvature of the tightly wound coil 20 causing the outer portion of the tightly wound coil to become the inner end 12a of the spring motor 10. As the arbor rotates, alternate layers of the inner end 12a of the spring element 12 and the extended eye 18, 18a are wound about the arbor 14 as shown in FIGS. 4 and 5. The arbor is further rotated until substantially the entire length of the spring element 12 is backwound around the arbor 14. The outer end 12b of the spring element 12 is either formed in a hook shape to engage the keeper or cup 16 or is mechanically fastened to the keeper or cup 16 by riveting or a similar means. Thereafter, the arbor 14 is allowed to rotate relative to the keeper or cup 16. Relative rotation of the arbor 14 and the keeper or cup 16 either causes substantially the entire length of the spring element 12 to become backwound about arbor 14 (FIG. 6) or the restoring force of spring element 12 causes the arbor 14 to rotate relative to the keeper of cup 16 allowing the spring element 12 to remain backwound in its "relaxed" orientation adjacent the inside cup 16 as shown in FIG. 1.

When using a relatively smaller diameter arbor, thicker and/or wider spring material or more brittle spring material, it may be necessary to anneal a portion 22 of the spring element 12 approximately 1 inch long, approximately 3 to 4 inches from the inner end 12a of the spring element 12, as shown in FIG. 2, to avoid fracturing the spring material when it is initially backwound around the arbor 14.

The extended eye portion 18 of the spring element 12 may be pre-stressed as part of or in the same direction as the pre-stressed tightly wound coil 20, although use of a straight extended eye portion 18a appears to improve the performance of a spring of the present invention through its first few turns. In this regard, an improved spring of the present invention having a spring element 12 which was identical to the improved spring whose performance was shown by the solid broken line in FIG. 9, was constructed. However, the extended eye portion 18 of the other spring was pre-stressed and assumed a curvature in the direction of the tightly wound coil 20 as shown by the solid line in FIGS. 2, 3 and 4. Such spring exhibited performance which was greater than the conventional backwound pre-stressed spring shown by the broken line in FIG. 9 but less initially than the performance of the spring motor having a spring element with a straight extended eye portion (the solid line in FIG. 9) as shown in the following table:

| Number of Turns | Output (in inch pounds) | | |
| --- | --- | --- | --- |
| | Conventional Spring Element (broken line in FIG. 9) | Curved Extended Eye | Straight Extended Eye (solid line in FIG. 9) |
| 2 | .62 | .90 | .95 |
| 4 | .95 | 1.20 | 1.30 |
| 6. | 1.25 | 1.45 | 1.40 |
| 8 | 1.40 | 1.60 | 1.60 |
| 10 | 1.50 | 1.75 | 1.65 |

Although the performance of the improved spring with the curved extended eye was initially lower than the performance of an otherwise identical spring having a straight extended eye, both springs exerted a substantially greater torque than a conventional pre-stressed backwound spring during the initial turns.

Although the present invention has been described herein with reference to particular embodiments, it is to be understood that these embodiments are merely illustrative of the principles and application of the invention. Thus, it is to be understood consequently, the appended claims should be broadly construed.

What is claimed:

1. An improved backwound pre-stressed flat spring motor comprising an arbor, a spring retaining means substantially concentric to said arbor, said arbor rotatable relative to said spring restraining means, a pre-stressed flat spring element located in said spring retaining means and having a natural direction of curvature and a first end including an eye portion extending from said first end, and a second end, said first end of said spring element fastened to said arbor with said extending eye portion extending past said arbor and said spring element backwound around said arbor in a direction opposite said natural direction of curvature and said second end of said spring element engaged in said retaining means whereby said extended eye portion of said spring element is wound and said first end of said spring element is backwound around said arbor in alternating layers.

2. The spring motor of claim 1 wherein said arbor is a split arbor and said first end of said spring element is engaged in said split arbor and said extending eye portion extends from said split arbor in a first direction and the remainder of said spring element extends from said split arbor in a second direction.

3. The spring motor of claim 2 further including an annealed portion on said spring element between said extending eye portion and said first end wherein said annealed portion is engaged in said split arbor.

4. The spring motor of claim 1 wherein said extending eye portion has a length at least equal to three times a circumference of said arbor.

5. The spring motor of claim 1 wherein said extending eye portion of said spring element extends substantially straight from said first end of said spring element when in an unrestrained condition.

6. The spring motor of claim 1 wherein said extended eye portion of said spring element is pre-stressed and when in an unrestrained condition, has a natural curvature in a direction and substantially equal to said natural curvature of said spring element.

7. The spring motor of claim 1 wherein when said arbor is rotated to a fully backwound position said alternating layers of spring elements wound and backwound about said arbor include at least two layers of extended eye portion.

8. An improved backwound pre-stressed flat spring motor comprising a split arbor, having a substantially diametrical split, a cup substantially concentric to said split arbor with said split arbor rotatable relative to said cup, a pre-stressed flat spring element within said cup having an initial natural direction of curvature and having a first end including an eye portion extending from said first end and having a second end remote from said remainder end, said first end of said spring element engaged in said split in said split arbor with said eye portion extending from said arbor in a first direction and a remainder of said spring element extending from said arbor in a second direction and said second end fixed to said cup, the remainder of said spring element wound around said arbor in a direction of curvature opposite to said natural direction of curvature of said spring element whereby said spring element wound around said arbor is comprised of at least two alternating layers of said extending eye portion and said first end of said spring element.

9. A method for making an improved backwound spring motor having a cup, a central arbor in said cup substantially coaxial to said cup with said central arbor rotatable relative to said cup, and a pre-stressed flat spring element retained in said cup and fastened to said central arbor and to said cup comprising the steps of forming a pre-stressed flat spring element into a tightly wound coil with a first end and a second end and a normal direction of curvature, fixing said first end of said tightly wound coil to an arbor forming the first end of said spring element of the spring motor with a portion extending beyond said arbor, initially backwinding a remainder of said spring element about said arbor in a direction opposite to said normal direction of curvature of said tightly wound coil and simultaneously winding said extending portion around said arbor in alternate layers with said spring element, and fastening the second end of said spring element to said cup.

10. The method of claim 9 further including the step of continuing the backwinding of said remainder of said spring element around said arbor after winding and backwinding said alternate layers around said arbor.

11. The method of claim 9 comprising the step of annealing an intermediate portion of said first end of said tightly wound coil before fixing said first end to said arbor and affixing said annealed portion to said arbor whereby the portion of said spring element extending beyond said arbor is not annealed.

12. The method of claim 9 in which at least two turns of wound and backwound spring element around said arbor has alternating layers of said remaining portion of said spring element and said portion of said spring element extending beyond said arbor.

13. The method of claim 9 wherein said portion of said spring element extending beyond said arbor is pre-stressed.

14. The method of claim 9 wherein said arbor is split and includes the step of engaging said first end of said spring element within said split in said arbor.

15. The method of claim 14 further including the step of annealing the portion of said spring element within said split in said split arbor prior to backwinding.

16. The method of making an improved backwound spring motor having a cup, a central arbor in said cup substantially coaxial to said cup with said central arbor rotatable relative to said cup and a pre-stressed flat spring element retained in said cup and fastened to said central arbor and to said cup comprising the steps of forming a pre-stressed flat spring element into a tightly wound coil having a first end extending substantially straight from said coil and a second end and a normal direction of curvature in said spring element comprising said coil, affixing said tightly wound coil to an arbor with said substantially straight portion of said first end extending from said arbor, backwinding said spring element about said arbor in a direction opposite to said normal direction of curvature of said spring element comprising said coil and simultaneously winding said first end around said arbor in alternate layers with said opening element, and fastening said second end of said spring element to said cup.

17. The method of claim 16 wherein at least the first two turns of said pre-stressed flat spring element wound on said arbor comprise alternating layers of said initially substantially straight portion extending from said coil and said spring material initially comprising said coil.

18. The method of claim 17 wherein said substantially straight portion of said first end is substantially equal to at least three times a circumference of said arbor.

* * * * *